United States Patent
Numata

(10) Patent No.: US 11,423,524 B2
(45) Date of Patent: Aug. 23, 2022

(54) IMAGE PROCESSING APPARATUS, METHOD FOR CONTROLLING IMAGE PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Aihiko Numata, Nagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 191 days.

(21) Appl. No.: 16/804,039

(22) Filed: Feb. 28, 2020

(65) Prior Publication Data
US 2020/0294214 A1 Sep. 17, 2020

(30) Foreign Application Priority Data

Mar. 11, 2019 (JP) .............................. JP2019-044191

(51) Int. Cl.
*H04N 5/235* (2006.01)
*G06T 5/50* (2006.01)
(Continued)

(52) U.S. Cl.
CPC .................. *G06T 5/50* (2013.01); *G06T 5/40* (2013.01); *G06V 10/10* (2022.01); *H04N 5/2351* (2013.01);
(Continued)

(58) Field of Classification Search
None
See application file for complete search history.

(56) References Cited

U.S. PATENT DOCUMENTS 10,827,129 B2 * 11/2020 Sasaki ................ H04N 9/04553
10,887,530 B2 * 1/2021 Sato .................... H04N 9/04515
(Continued)

FOREIGN PATENT DOCUMENTS

| CN | 1794783 A | 6/2006 |
| CN | 103929628 A | 7/2014 |

(Continued)

OTHER PUBLICATIONS

First Office Action issued by the State Intellectual Property Office of the People's Republic of China dated Apr. 1, 2021 in corresponding CN Patent Application No. 202010164950.3, with English translation.

(Continued)

*Primary Examiner* — James M Hannett
(74) *Attorney, Agent, or Firm* — Carter, DeLuca & Farrell LLP

(57) ABSTRACT

An image processing apparatus comprising, an acquisition unit configured to acquire a visible light image and an invisible light image, a determination unit configured to determine a region on an image based on the visible light image or the invisible light image acquired by the acquisition unit, and a combining unit configured to generate a composite image such that a combination ratio of the visible light image is larger than a combination ratio of the invisible light image in the region determined by the determination unit, wherein the acquisition unit acquires the visible light image for which an exposure is adjusted such that a region of the visible light image that corresponds to the region determined by the determination unit has an appropriate exposure.

13 Claims, 7 Drawing Sheets

(51) Int. Cl.
    *G06T 5/40*         (2006.01)
    *H04N 5/265*     (2006.01)
    *G06V 10/10*     (2022.01)

(52) U.S. Cl.
    CPC ........... *H04N 5/2353* (2013.01); *H04N 5/265* (2013.01); *G06T 2207/10024* (2013.01); *G06T 2207/10048* (2013.01); *G06T 2207/20221* (2013.01)

(56) References Cited

U.S. PATENT DOCUMENTS

| | | | |
|---|---|---|---|
| 2014/0192202 A1* | 7/2014 | Sano | H04N 5/332 348/164 |
| 2018/0069996 A1* | 3/2018 | Shukla | H04N 9/07 |
| 2018/0336664 A1 | 11/2018 | Ono | |
| 2020/0033701 A1 | 1/2020 | Numata | |
| 2020/0098148 A1 | 3/2020 | Numata | |
| 2020/0137293 A1 | 4/2020 | Numata | |
| 2020/0154087 A1 | 5/2020 | Numata | |

FOREIGN PATENT DOCUMENTS

| | | | | |
|---|---|---|---|---|
| CN | 104995910 A | 10/2015 | | |
| CN | 108429887 A | 8/2018 | | |
| CN | 110210541 A | 9/2019 | | |
| EP | 2579574 A1 * | 4/2013 | ............... | H04N 9/04 |
| JP | 2005031800 A * | 2/2005 | | |
| JP | 2006180270 A | 7/2006 | | |
| JP | 2007208346 A | 8/2007 | | |
| JP | 2010161459 A | 7/2010 | | |
| JP | 2013247492 A | 12/2013 | | |
| JP | 2017156464 A * | 9/2017 | | |

OTHER PUBLICATIONS

Extended European Search Report issued by the European Patent Office dated Jul. 22, 2020 in corresponding EP Patent Application No. 20158466.1.

* cited by examiner

IMAGE PROCESSING APPARATUS, METHOD FOR CONTROLLING IMAGE PROCESSING APPARATUS, AND NON-TRANSITORY COMPUTER-READABLE STORAGE MEDIUM

BACKGROUND OF THE INVENTION

Field of the Invention

The present disclosure relates to an image processing apparatus, a method for controlling an image processing apparatus, and a non-transitory computer-readable storage medium.

Description of the Related Art

It is necessary for image capture apparatuses for surveillance applications or the like to acquire clear subject images in various environments. An image capture apparatus that includes a solid-state image sensor that is sensitive to visible light and a solid-state image sensor that is sensitive to infrared light, and that is configured to display an image obtained by combining images acquired by these two solid-state image sensors is proposed as an image capture apparatus capable of acquiring a clear subject image even in an environment in which a subject image cannot be acquired using only visible light (Japanese Patent Laid-Open No. 2006-180270 and Japanese Patent Laid-Open No. 2007-208346).

Japanese Patent Laid-Open No. 2006-180270 proposes a method in which in a case where a partial region of an image acquired by a visible light image sensor (a visible light image hereinafter) is overexposed, the overexposed region is replaced with an image acquired by an infrared light image sensor (an infrared light image hereinafter). Also, Japanese Patent Laid-Open No. 2007-208346 proposes a method in which in a case where a partial region of a visible light image is underexposed, the underexposed region is replaced with an infrared light image. Use of such methods makes it possible to acquire a clear subject image even in a case where blown-out highlights and blocked-up shadows appear in a partial region of a visible light image.

However, issues arise in that with the above-described method, information regarding colors of a subject will be lost in the region replaced with the infrared light image. In particular, when it is assumed that an image capture apparatus is used to recognize a subject, for surveillance applications and the like, in a case where color information is important for recognition of the subject, insufficiency of color information will be a large issue.

SUMMARY OF THE INVENTION

The present disclosure provides a technique for generating an image obtained by combining a visible light image and an infrared light image without losing color information regarding a subject.

One aspect of exemplary embodiments relates to an image processing apparatus comprising an acquisition unit configured to acquire a visible light image and an invisible light image, a determination unit configured to determine a region on an image based on the visible light image or the invisible light image acquired by the acquisition unit, and a combining unit configured to generate a composite image such that a combination ratio of the visible light image is larger than a combination ratio of the invisible light image in the region determined by the determination unit, wherein the acquisition unit acquires the visible light image for which an exposure is adjusted such that a region of the visible light image that corresponds to the region determined by the determination unit has an appropriate exposure.

Further features of the invention will become apparent from the following description of exemplary embodiments with reference to the attached drawings.

DESCRIPTION OF THE EMBODIMENTS

Figure 1:
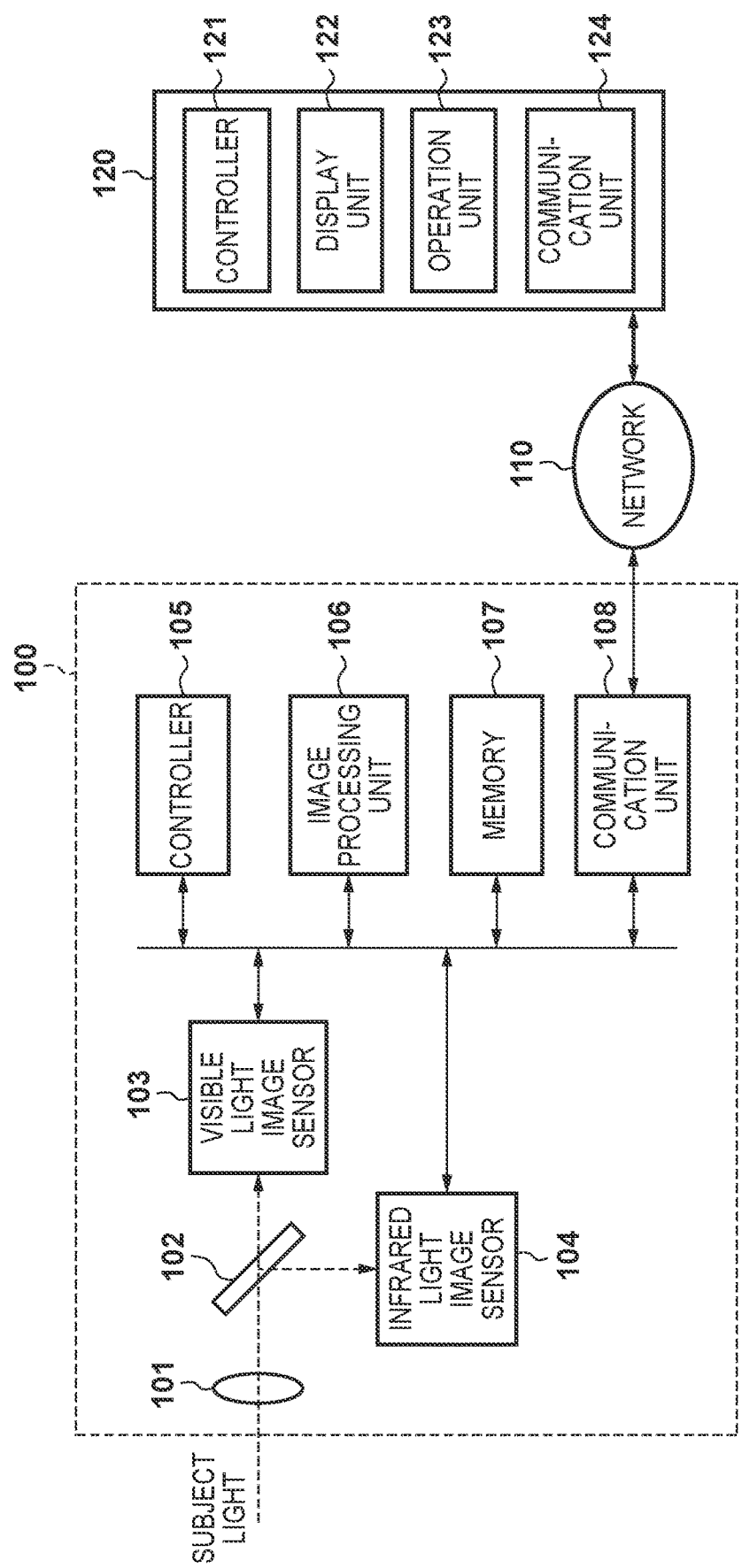
FIG. 1 is a diagram showing a configuration example of a system corresponding to an exemplary embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Embodiment 1

A configuration of a system corresponding to an exemplary embodiment will be described with reference to FIG. 1. FIG. 1 is a diagram showing a configuration example of a system 10 according to this embodiment. The system 10 corresponding to this embodiment is constituted by an image capture apparatus 100 and an information processing apparatus 120 being connected to each other via a network 110.

The following describes configurations of the image capture apparatus 100 and the information processing apparatus 120 corresponding to the embodiment. The image capture apparatus 100 is constituted as an image processing apparatus that includes one optical system constituted by an image forming optical system 101 and a light separation unit 102, and two image sensors 103 and 104 that share the optical system. The image sensors are constituted as a visible light image sensor 103 that receives visible light that has passed through the optical system and generates an image signal (a visible light image), and an infrared light image sensor (an invisible light image sensor) 104 that receives infrared light that has passed through the optical system and is invisible light, and generates an image signal (an infrared light image or invisible light image), as one example. The image sensors 103 and 104 are each constituted by a CMOS sensor, a CCD sensor, or the like, and convert a subject image formed on an image capture plane into an electrical signal and output the electrical signal. The image capturing signals output from the image sensor 103 and the like as electrical signals are input to an image processing unit 106.

The image forming optical system 101 in the optical system includes a single lens or a group of a plurality of lens. Also, the image forming optical system 101 may include any one or more of control mechanisms such as zoom, focus, diaphragm, and camera shake compensation. The light separation unit 102 is constituted by a wavelength selection prism, and is configured such that light (visible light) having a wavelength shorter than a specific wavelength passes through the wavelength selection prism, and light (infrared light) having a wavelength longer than the specific wavelength is reflected by the wavelength selection prism. Note that transmission/reflection here refers to transmission/reflection of 80% or more of light. A component of visible light that has passed therethrough is photoelectrically converted by the visible light image sensor 103 disposed rearward, and an image is formed. On the other hand, a component of reflected infrared light is photoelectrically converted by the infrared light image sensor 103 disposed so as to be aligned with the optical axis, and an image is formed. Here, the specific wavelength may be set to a wavelength in a range of 600 nm to 750 nm inclusive, for example. In this case, the borderline between visible light and infrared light is a wavelength in a range of 600 nm to 750 nm inclusive. Also, infrared light corresponds to light having a wavelength from the specific wavelength to 2500 nm, for example.

Pixels in the visible light image sensor 103 include on-chip color filters arranged in the RGB Bayer array, and a visible light image in RGB format output from the visible light image sensor 103 includes color information as well as luminance information. On the other hand, infrared light image output from the infrared light image sensor 104 includes only luminance information. Note that the visible light image sensor 103 need only have a sensitivity distribution in a range mainly including visible light, and may have a sensitivity distribution in a range other than visible light. Also, the infrared light image sensor 104 need only have a sensitivity distribution in a range mainly including infrared light, and may have a sensitivity distribution in a range other than infrared light. The controller 105 controls the driving of the visible light image sensor 103 and the infrared light image sensor 104, and the reading of image signals thereby.

Figure 2A:
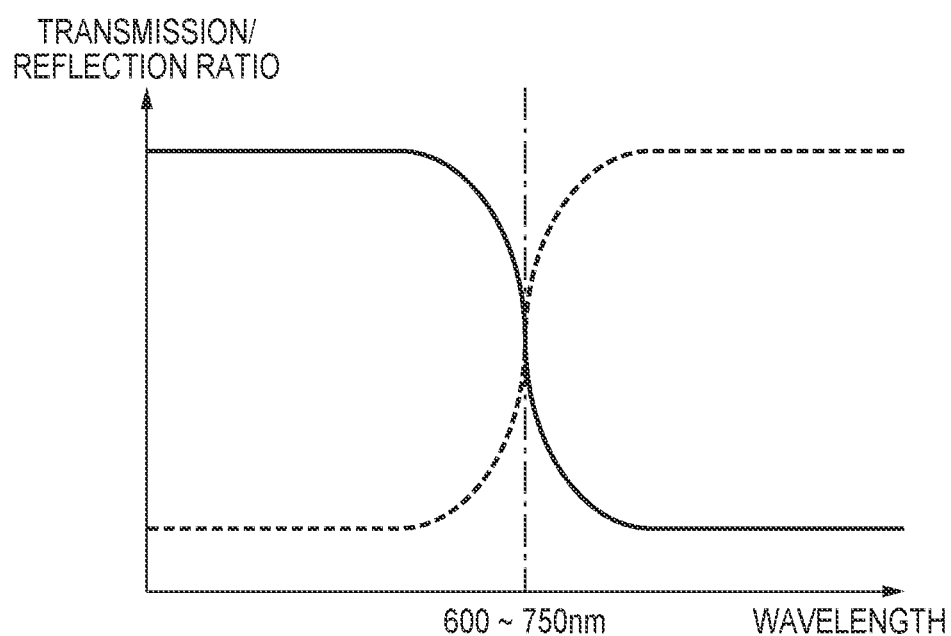
FIG. 2A is a diagram showing an example of a spectral transmission spectrum and a spectral reflection spectrum of a wavelength selection prism corresponding to an exemplary embodiment.

FIG. 2A shows an example of a spectral transmission spectrum and a spectral reflection spectrum of the wavelength selection prism. The solid line indicates transmission, and a dotted line indicates reflection. In this manner, transmission and reflection are switched at the specific wavelength as the borderline.

The visible light image sensor 103 and the infrared light image sensor 104 are each connected to the controller 105 and the image processing unit 106 and are controlled thereby, and imaging is performed utilizing the shared optical system in synchronization with each other. Image capturing signals obtained through such synchronous imaging constitute a composite image of one frame through the downstream combining processing. In view of this, hereinafter, "for each frame" refers to an image capturing signal obtained through synchronous imaging, or an image (including a composite image) obtained from the image capturing signals. The image capturing signals output from the image sensor 103 and the like are subjected to various types of image processing in the image processing unit 106.

The image processing unit 106 performs image processing such as pixel interpolation processing or color conversion processing on image capturing signals, and generates data of images that are respectively captured by the image sensors (also referred to as "captured images" or "pre-composite images" as images to be subjected to combining processing). This image processing may include various types of correction processing such as pixel defect correction or lens correction, detection processing for adjusting the black level, the focus, the exposure, and the like, demosaic processing, white balance processing, gamma correction processing, edge enhancement processing, and noise suppression processing, for example.

Also, the image processing unit 106 generates a composite image through combining processing for combining a visible light image and an infrared light image that are captured by the shared optical system in synchronization with each other in accordance with an image capturing mode selected by a user. Combining processing refers to processing described below, for example. First, a visible light image that is read out in RGB format is subjected to demosaic processing, is developed, and is converted into an image in YUV format. YUV signals obtained from the visible light image at this time are respectively denoted as $Y_1$, $U_1$, and $V_1$. Similarly, an infrared light image is also developed and is converted into YUV format. A Y signal of the infrared light image at this time is denoted as $Y_2$. Note that the infrared light image does not have color information, and U and V values are zero.

Then, the $Y_1$ signal and the $Y_2$ signal are combined to generate a composite image. Specifically, when the YUV signals of the composite image are respectively denoted as $Y_3$, $U_3$, and $V_3$, the composite image is generated using equations below.

$$Y_3 = \alpha \times Y_1 + (1-\alpha) \times Y_2 \quad \text{(Equation 1)}$$

$$U_3 = U_1 \quad \text{(Equation 2)}$$

$$V_3 = V_1 \quad \text{(Equation 3)}$$

Here, $\alpha$ indicates a coefficient for determining a combination ratio of the visible light image and the infrared light image, and is a real number of 0 to 1 inclusive. The composite image is closer to a visible light image as $\alpha$ increases, and thus has image signals with better color reproducibility. With the image capture apparatus 100 in this embodiment, $\alpha$ varies in each region. Specifically, $\alpha$ can be changed between a region (a first region) in which the visible light image has a luminance ($Y_1$) of a predetermined value or more (a first threshold or more), and a region (a second region) other than the first region in which the visible light image has a luminance $Y_1$ of less than the predetermined value (less than the first threshold). Details thereof will be described later. Also, the controller 105 can determine exposure conditions of the visible light image sensor 103 and an exposure target (so-called EV value) of the infrared light image sensor 104 in accordance with the image capturing mode selected by the user.

The captured images are stored in the memory 107. Also, images that are respectively captured by the image sensors and stored in the memory 107 are successively combined by an image combining unit of the image processing unit 106 to generate an image for each frame, and the combined image is stored in the memory as a composite image of the visible light image and the infrared light image in a low illuminance environment.

The controller 105 may be constituted by a CPU, an MPU, other dedicated arithmetic circuits, or the like, for example, and performs overall control of the image capture apparatus 100. The memory 107 is constituted by a non-volatile memory, a RAM, or the like. The non-volatile memory stores processing procedures (control programs) of the controller 105, and various parameters. The RAM is used as a work area of the controller 105, and is also used as a storage area for performing image processing. Also, the controller 105 may include the image processing unit 106, the image combining unit (not shown), and a compression/decompression unit, and processing functions of these blocks can be realized by the CPU executing corresponding programs stored in the memory 107. Alternatively, these processing functions may be realized by a dedicated arithmetic circuit constituting the controller 105.

The controller 105 may further compress a composite image using the compression/decompression unit (not shown) to generate a compressed image. The compression/decompression unit can execute still image compression and moving image compression, and an image compressing method may be based on standards such as H.264, H.265, MPEG, or JPEG, for example. Also, an image in any format including mp4, avi format, or the like may be generated. The compressed image generated by the compression/decompression unit may be recorded in a recording medium (not shown), the memory 107, or the like that is mounted on the image capture apparatus 100, and is transmitted from a communication unit 108 to an external information processing apparatus 120 via the network 110. The communication unit 108 is a network processing circuit, converts the compressed composite image into a communication signal conforming to a communication protocol, and then distributes the communication signal over the network 110. The network 110 may be constituted as a communication line for enabling IP based communication such as a LAN or the Internet, for example. Alternatively, a connection between the image capture apparatus 100 and the information processing apparatus 120 may be realized by a wired connection using a cable for transferring information (various connection cables such as USB, DVI, and HDMI cables), or may be realized by a wireless connection in accordance with a wireless communication protocol such as Bluetooth or a WLAN.

The information processing apparatus 120 is typically constituted as a personal computer, and is connected to the image capture apparatus 100 via the network 110. A controller 121 of the information processing apparatus 120 may be constituted by a CPU, an MPU, other dedicated arithmetic circuits, or the like, and performs overall control of the information processing apparatus 120. Also, the controller 121 receives a composite image from the image capture apparatus 100 and performs decompression processing thereon, and performs various types of control by transmitting control information or commands for controlling the image capture apparatus 100. A display unit 122 displays a user interface (UI) or an image received from the image capture apparatus 100, for a user (an operator) of the information processing apparatus 120. An operation unit 123 is a user physical interface for accepting an operation input made by a user. A desired control input can be made by operating a mouse, a keyboard, or the like based on the user interface (UI) such as an icon displayed on the display unit 122. A communication unit 124 is a network processing circuit, can communicate with the image capture apparatus 100 via the network 110, receive the composite image distributed by the image capture apparatus 100, and control operations of the image capture apparatus 100.

Figure 2B:
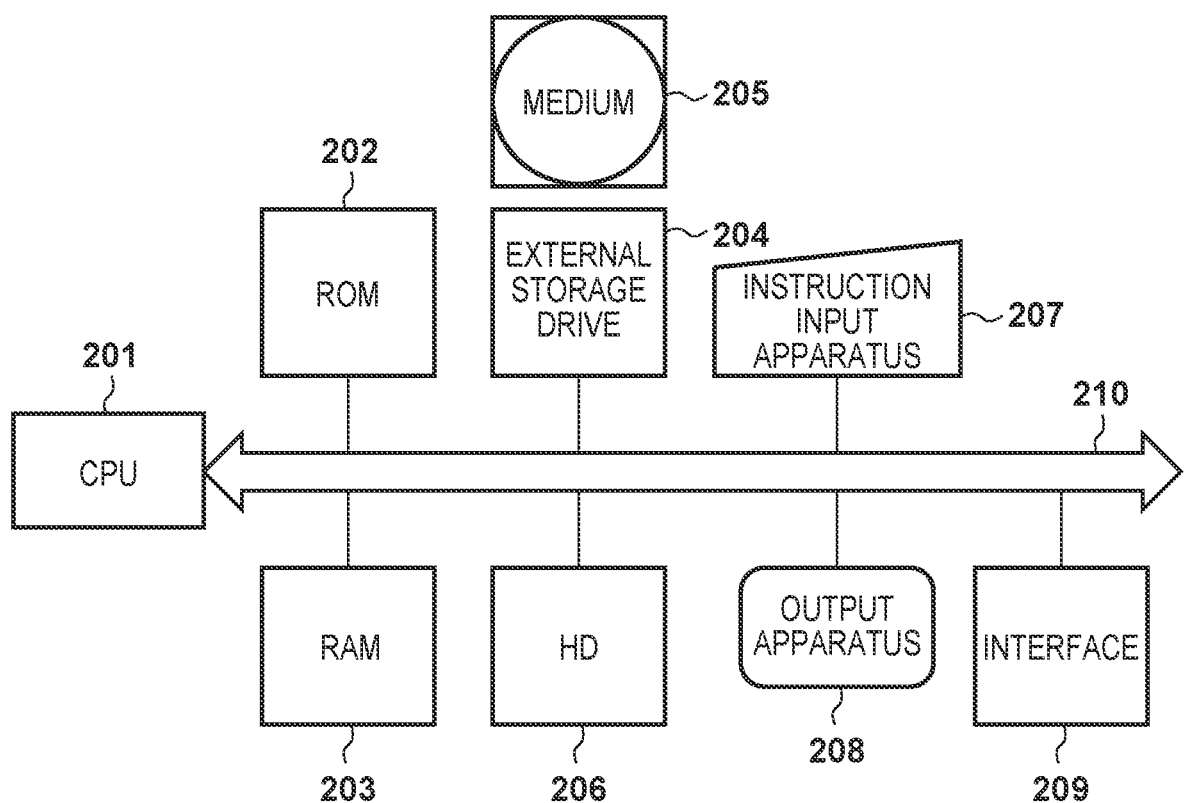
FIG. 2B is a diagram showing one example of a hardware configuration of an apparatus corresponding to an exemplary embodiment.

One example of hardware configurations of the above-described image capture apparatus 100 and the information processing apparatus 120 is shown in FIG. 2B. FIG. 2B is a block diagram showing one example of the hardware configuration that mainly relates to the controllers and processing units of the image capture apparatus 100 and the information processing apparatus 120. Here, the image sensors and the optical mechanism of the image capture apparatus 100 are not shown.

In FIG. 2B, the CPU 201 realizes processing corresponding to this embodiment by executing an operating system (OS), a control program, a process program, or the like stored in a hard disk device (referred to as an "HD" hereinafter) 206. Also, the CPU 201 controls transmission and reception of data to/from an external apparatus via an interface (I/F) 209. The CPU 201 may function as the controller 105 or the image processing unit 106 shown in FIG. 1.

A ROM 202 internally stores various data such as application programs for executing predetermined processing in addition to the basic I/O program. A RAM 203 temporarily stores various data, and functions as the main memory, a work area, or the like of the CPU 201. An external storage drive 204 is an external storage drive for realizing an access to a recording medium, and can load programs or the like stored in a medium (recording medium) 205 on this computer system. Also, images obtained through imaging by the image capture apparatus 100 can be accumulated therein. An HD (hard disk) that functions as a large-capacity memory is used as the external storage device 206 in this embodiment. Application programs, OS, control program, related programs, and the like are stored in the HD 206. Note that a non-volatile storage device such as a flash memory (registered trademark) may be used, instead of the hard disk. The memory 107 shown in FIG. 1 is constituted by the ROM 202, the RAM 203, or the HD 206.

A touch panel, various buttons, various keys, and the like correspond to an instruction input apparatus 207. A system bus 210 manages the flow of data in the device.

An output apparatus 208 outputs a command input by the instruction input apparatus 207, a device response thereto, and the like. The output apparatus 208 may include a display, a speaker, a headphone jack, and the like. The system bus 210 manages the flow of data in the apparatus.

The interface (referred to as an "I/F") 209 plays the role of mediating data exchange with an external apparatus. Specifically, the I/F 209 may include a wireless communication module, and the module may include a peripheral circuit mechanism, such as an antenna system, an R/F transmitter/receiver, one or more amplifiers, a tuner, one or more oscillators, a digital signal processor, a CODEC chipset, a subscriber identification module card, and a memory.

Also, the module may include a wired communication module for a wired connection. The wired communication module is capable of communication with other devices via one or more external ports. Also, various software components for processing data may be included. An external port is coupled to another device directly via Ethernet, USB, IEEE1394, or the like or indirectly via a network. Note that these may also be constituted by software for realizing the functions that are equivalent to those of the above-described apparatuses, instead of the hardware devices.

Next, the flow of processing executed by the image capture apparatus 100 will be described with reference to FIG. 3. The processing corresponding to FIG. 3 can be realized by one or more processors (the CPU 201 and the like), which function as the controller 105 and the image processing unit 106, executing the corresponding programs (stored in the ROM 202, HD 206, and the like), for example.

Figure 4:
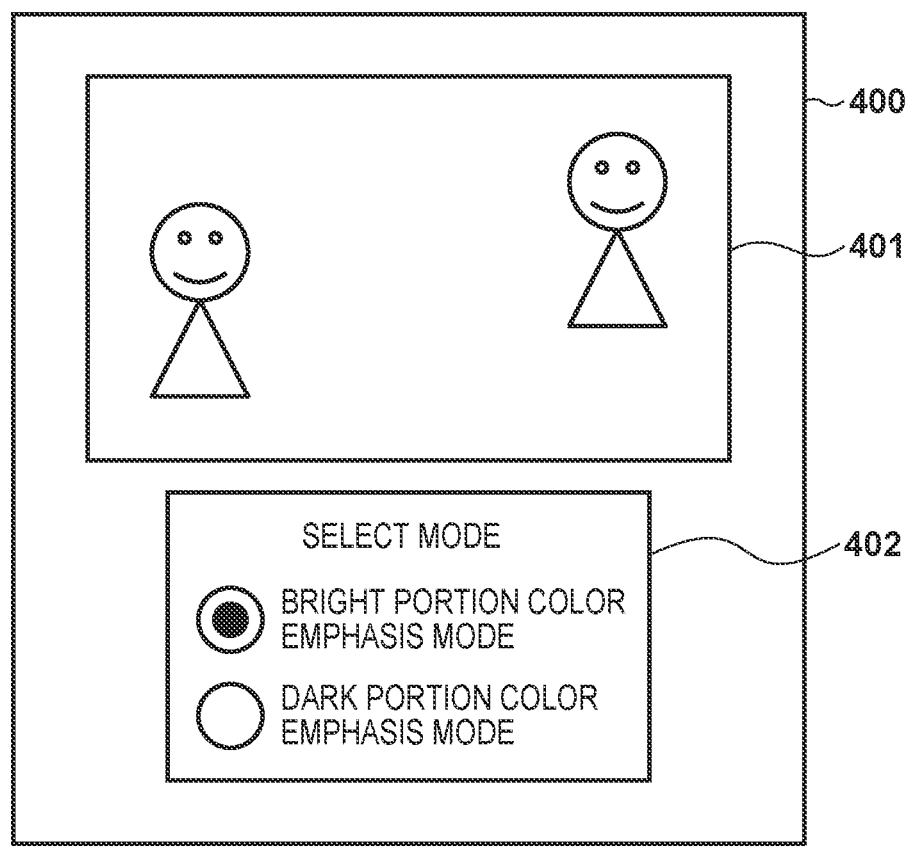
FIG. 4 is a diagram illustrating a method for selecting a mode corresponding to an exemplary embodiment.

First, the controller 105 determines an image capturing mode in step S301. A user can designate the image capturing mode in advance. Here, a method for designating the image capturing mode will be described. FIG. 4 is a diagram illustrating a method for selecting the image capturing mode. The controller 105 displays a screen such as that shown in FIG. 4 on the display of the output apparatus 208. A screen 400 includes a region 401 for displaying a composite image, and a region 402 for displaying a selection interface for selecting a mode. A "bright portion color emphasis mode" is displayed as a first image capturing mode and a "dark portion color emphasis mode" is displayed as a second image capturing mode on the selection interface displayed in the region 402. FIG. 4 shows the state in which the "bright portion color emphasis mode" is selected. The user can switch modes to be selected by operating the button or touch panel of the instruction input apparatus 207.

Although a case where a display screen shown in FIG. 4 is displayed on the image capture apparatus 100 and an operation input is made will be described in this embodiment, the embodiment is not limited thereto. A configuration may be adopted in which the image capture apparatus is connected to the external information processing apparatus 120 via the network 110, the screen shown in FIG. 4 is displayed on the information processing apparatus 120, and the user performs a selection operation. In this case, information regarding the selected mode is transmitted to the image capture apparatus 100 via the network 110, and is stored in the memory 107 of the image capture apparatus 100.

If, in step S301, the controller 105 determines that the "bright portion color emphasis mode", that is, the "first image capturing mode", is selected, processing moves to step S302A. In this case, color information regarding a subject located in a bright portion in an imaging scene is more important to the user than color information regarding a subject located in a dark portion, and the user needs to give priority to the color reproducibility of the subject in the bright portion. In view of this, in the first image capturing mode, the exposure target is determined so as to generate a composite image with an emphasis on the color information regarding the bright portion, and combining processing is performed.

On the other hand, if the controller 105 has determined that the "dark portion color emphasis mode", that is, the "second image capturing mode", is selected, the processing moves to step S302B. In this case, the user decides that color information regarding a subject located in the dark portion in the imaging scene is more important than color information regarding a subject located in the bright portion. In view of this, in the second image capturing mode the exposure target is determined so as to generate a composite image with an emphasis on the color information regarding the dark portion, and combining processing is performed.

In a case where the user selects the image capturing mode in this manner, it is necessary to determine the importance of pieces of color information regarding bright and dark portions, and thus it is preferable that a composite image displayed in the region 401 of the screen 400 is an image with an emphasis on color reproducibility over the SN ratio. In view of this, a composite image displayed when the user selects a mode is preferably close to a visible light image ($\alpha$ is close to 1), and more preferably coincides with the visible light image ($\alpha=1$).

Return to FIG. 3, and the case where it is determined that the first image capturing mode is selected will be described. If it is determined that the first image capturing mode is selected, the image processing unit 106 divides the visible light image into two regions in step S302A. These regions correspond to a "bright portion" and a "dark portion" in the visible light image. In this embodiment, the region corresponding to the bright portion is referred to as a "first region", and the region corresponding to the dark portion is referred to as a "second region". In the first image capturing mode, the first region is designated as a priority region in which a priority is given to color reproducibility, and in the second image capturing mode, the second region is designated as a priority region in which a priority is given to color reproducibility. A threshold (a first threshold: TH1) of a luminance value is used to divide the region. Specifically, the visible light image is divided into the first region having a luminance value $Y_1$ of a predetermined value or more (the first threshold or more), and the second region having a luminance value $Y_1$ of less than the predetermined value (less than the first threshold).

Figure 5:
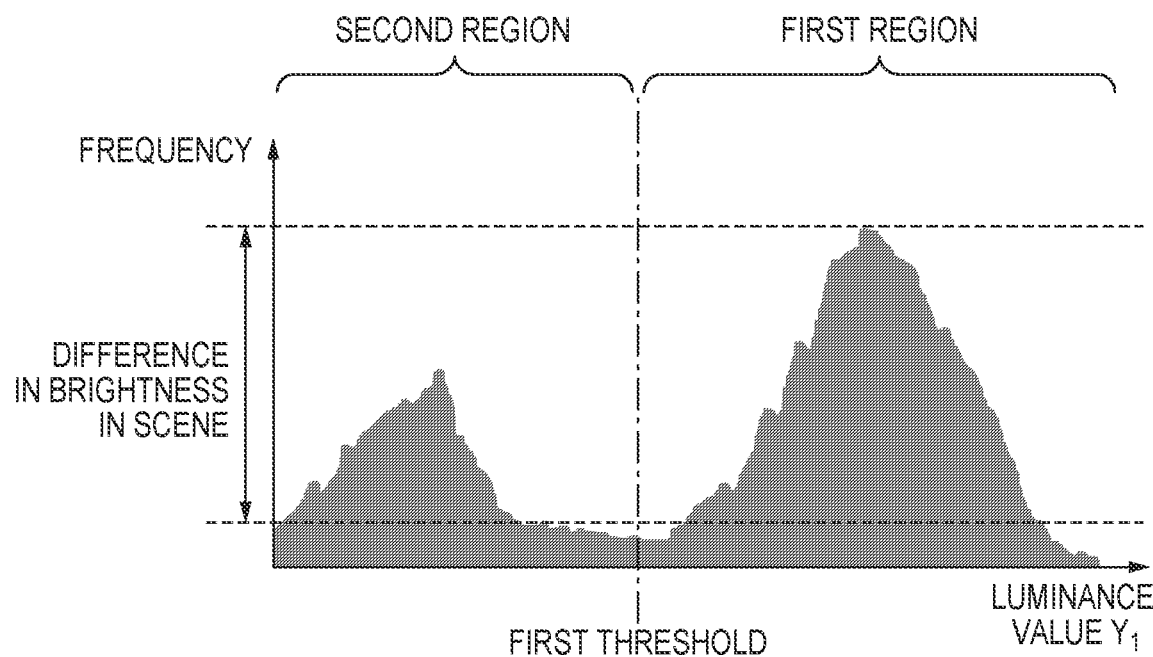
FIG. 5 is a diagram illustrating a method for setting a first threshold corresponding to an exemplary embodiment.

Here, a method for setting the first threshold will be described with reference to FIG. 5. FIG. 5 is a diagram illustrating a method for setting the first threshold (TH1) corresponding to an embodiment. In FIG. 5, the horizontal axis indicates the luminance value ($Y_1$) of the visible light image, and the vertical axis indicates the frequency, and accordingly the histogram of the luminance values of the visible light image is shown. Usually, there are many cases where the histogram has a shape such that the histogram is divided into two blocks, in a scene with a large difference in brightness. In FIG. 5, a range indicated as the first region on the right side corresponds to the bright portion, and a range indicated as the second region on the left side corresponds to the dark portion. In view of this, the first threshold is set to a value located in a section between the two blocks of the histogram. Specifically, the first threshold can be determined using a discriminant analysis method or the like that is used in a case of a banalization problem of a grey scale image, such that the degree of separation of the luminance distribution is the largest. Note that "the largest" here may include an error, and the first threshold may be determined such that the degree of separation is half or more of the maximum value of the degree of separation of the distribution, for example.

Again, return to FIG. 3, and in step S303A, the controller 105 determines the exposure targets of the visible light image sensor 103 and the infrared light image sensor 104. The exposure target of the visible light image sensor 103 is determined from an average value (or an intermediate value) $Y_{11av}$ of the luminance values $Y_1$ of the visible light image in the first region. Specifically, when an appropriate exposure level (usually, about 0.1 times to 0.2 times the saturation level of an image signal) is $Y_0$ and the initial value of the exposure target is $EV_0$, an exposure target $EV_{11}$ of the visible light image sensor 103 in the next frame is determined using the following equation.

$$EV_{11}=EV_0+\log_2(Y_{11av}/Y_0) \quad \text{(Equation 4)}$$

On the other hand, the exposure target of the infrared light image sensor 104 is determined from an average value (or an intermediate value) $Y_{22av}$ of the luminance values $Y_2$ of the infrared light image in the second region. Specifically, the exposure target $EV_{12}$ of the infrared light image sensor 104 in the next frame is determined using the following equation.

$$EV_{12}=EV_0+\log_2(Y_{22av}/Y_0) \quad \text{(Equation 5)}$$

That is, in step S303A, the exposure targets are determined such that in the next frame, the luminance of the visible light image in the first region and the luminance of the infrared light image in the second region respectively reach appropriate exposure levels. In this manner, in the first image capturing mode, the exposure target of the visible light image sensor 103 is higher than the exposure target of the infrared light image sensor 104. Specifically, it is sufficient that the visible light image sensor 103 and the infrared light image sensor 104 have different exposure times (so-called TV values) or different analog gains (so-called SV values), to have different exposure targets.

In the subsequent step S304A, the controller 105 controls the visible light image sensor 103 and the infrared light image sensor 104 using the exposure targets determined in step S303A to capture images, and then the image processing unit 106 performs combining processing using the generated visible light image and infrared light image. Specifically, a composite image is generated with the coefficient α for the first region being $\alpha_1$ and the coefficient α for the second region being $\alpha_2$. At this time, $\alpha_1$ and $\alpha_2$ satisfy the following relational expression.

$$\alpha_1 > \alpha_2 \quad \text{(Equation 6)}$$

With regard to the first region, that is, in the case of $Y_1 \geq TH1$, Equation 1 is transformed as follows.

$$Y_3 = \alpha_1 \times Y_1 + (1-\alpha_1) \times Y_2 \quad \text{(Equation 1')}$$

Also, with regard to the second region, that is, in the case of $Y_1 < TH1$, Equation 1 is transformed as follows.

$$Y_3 = \alpha_2 \times Y_1 + (1-\alpha_2) \times Y_2 \quad \text{(Equation 1'')}$$

In this manner, in the first image capturing mode of this embodiment, the exposure targets are set and combining processing is performed such that the first region corresponding to a bright portion is closer to the visible light image than the second region corresponding to a dark portion is. As a result, the color reproducibility of an image signal of the first region that is a priority region is better than that of the second region.

In Equation 6, it is preferable that $\alpha_1$ is closer to 1 and $\alpha_2$ is closer to 0, and a configuration may be adopted in which $\alpha_1=1$ and $\alpha_2=0$, for example. Alternatively, a configuration may be adopted in which in the first image capturing mode, the first region of the composite image coincides with the visible light image, and the second region of the composite image coincides with the infrared light image.

The reasons therefor will be described below. The visible light image acquired in step S304A is captured such that the first region has an appropriate exposure level, and thus the second region of the visible light image is captured under a condition of underexposure relative to appropriate conditions, and thus blocked-up shadows are likely to appear. Thus, as $\alpha_2$ is closer to 1, blocked-up shadows are more likely to appear in the second region. Similarly, the infrared light image acquired in step S304A is captured such that the second region has an appropriate exposure level, and thus the first region of the infrared light image is captured under a condition of overexposure relative to appropriate conditions, and thus blown-out highlights are likely to appear. Thus, as $\alpha_1$ is closer to 0, blown-out highlights are more likely to appear in the first region.

Note that the combination coefficient α may be changed stepwise at the boundary between the first region and the second region at the time of combining processing. Specifically, although a region where $Y_1 \geq TH1$ is the first region and a region where $TH1 > Y_1$ is the second region in the above description, a second threshold TH2 (TH1>TH2) can be further provided. At this time, a configuration may be adopted in which a region where $TH2 > Y_1$ is set to the second region and in a range of $TH1 > Y_1 \geq TH2$, the combination coefficient α is changed to gradually decrease from $\alpha_1$ to $\alpha_2$, from the side on which $Y_1$ is large (the side closer to the first region) toward the side on which $Y_1$ is small (the side closer to the second region), for example. A natural composite image can be obtained due to a smooth boundary being formed by changing a stepwise at the boundary between the first region and the second region in this manner.

Return to FIG. 3, and when the processing in step S304A is complete, processing from step S302A to step S304A is repeated for each frame. Here, the first threshold is updated from the histogram of the visible light image, the exposure targets are updated from the luminance of the visible light image in the first region and the luminance of the infrared light image in the second region, images are captured for the next frame, and combining processing is performed.

At this time, the first threshold need not be updated for each frame. A process load can be reduced by reducing the frequency of update of the first threshold, and power consumption can be reduced. On the other hand, it is possible to more quickly handle a change in brightness over time in a case where the frequency of update of the first threshold is increased. Also, a configuration may be adopted in which in a case where the first threshold is updated, a control is performed to keep the amount of a change at a certain value or less. It is possible to suppress the occurrence of a so-called hunching phenomenon by suppressing a rapid increase or decrease of the first threshold in a short time in this manner.

Next, the case where in step S301, it is determined that the second image capturing mode is selected will be described. If it is determined that the second image capturing mode is selected, similarly to step S302A, the image processing unit 106 divides the visible light image into two regions in step S302B. Specifically, the visible light image is divided into the first region having a luminance value $Y_1$ of the first threshold or more, and the second region having a luminance value $Y_1$ of less than the first threshold. Similarly to the case described in step S302A, the first threshold can be determined based on the histogram of the visible light image.

Then, in step S303B, the controller 105 determines the exposure targets of the visible light image sensor 103 and the infrared light image sensor 104. The exposure target of the visible light image sensor 103 is determined from an average value (or an intermediate value) $Y_{12av}$ of the luminance values $Y_2$ of the visible light image in the second region. Also, the exposure target of the infrared light image sensor 104 is determined from an average value (or an intermediate value) $Y_{21av}$ of the luminance values $Y_2$ of the infrared light image in the first region. Similarly to step S303A, the exposure target $EV_{11}$ of the visible light image sensor 103 and the exposure target $EV_{12}$ of the infrared light image sensor 104 in the next frame are determined using the following equation.

$$EV_{11}=EV_0+\log_2(Y_{12av}/Y_0) \quad \text{(Equation 7)}$$

$$EV_{12}=EV_0+\log_2(Y_{21av}/Y_0) \quad \text{(Equation 8)}$$

That is, in step S303B, the exposure targets are determined such that in the next frame, the luminance of the infrared light image in the first region and the luminance of the visible light image in the second region respectively reach appropriate exposure levels. In this manner, in the second image capturing mode, the exposure target of the visible light image sensor 103 is lower than the exposure target of the infrared light image sensor 104. Specifically, it is sufficient that the visible light image sensor 103 and the infrared light image sensor 104 have different exposure times (so-called TV values) or different analog gains (so-called SV values), to have different exposure targets.

In the subsequent step S304B, the controller 105 controls the visible light image sensor 103 and the infrared light image sensor 104 using the exposure targets determined in step S303B to capture images, and then the image processing unit 106 performs combining processing using the generated visible light image and infrared light image. Specifically, a composite image is generated with the combination coefficient for the first region being $\alpha_1$ and the combination coefficient for the second region being $\alpha_2$. At this time, $\alpha_1$ and $\alpha_2$ satisfy the following relational expression. Also, similarly to the case where the first image capturing mode is selected, Equation 1 is transformed as Equation 1' for the first region and Equation 1" for the second region.

$$\alpha_1<\alpha_2 \quad \text{(Equation 9)}$$

In this manner, in the second image capturing mode of this embodiment, the exposure targets are set and combining processing is performed such that the second region corresponding to a dark portion is closer to the visible light image than the first region is. As a result, the color reproducibility of an image signal of the second region that is a priority region is better than that of the first region.

According to Equation 9, it is preferable that $\alpha_1$ is closer to 0 and $\alpha_2$ is closer to 1, and a configuration may be adopted in which $\alpha_1=0$ and $\alpha_2=1$. Alternatively, a configuration may be adopted in which in the second image capturing mode, the second region of a composite image coincides with a visible light image, and the first region of the composite image coincides with an infrared light image.

The reasons therefor will be described below. The visible light image acquired in step S304B is captured such that the second region has an appropriate exposure level, and thus the first region of the visible light image is captured under a condition of overexposure relative to appropriate conditions, and thus blown-out highlights are likely to appear. Thus, as $\alpha_1$ is closer to 1, blown-out highlights are more likely to appear in the first region. Similarly, the infrared light image acquired in step S304B is captured such that the first region has an appropriate exposure level, and thus the second region of the infrared light image is captured under a condition of underexposure relative to appropriate conditions, and thus blocked-up shadows are likely to appear. Thus, as $\alpha_2$ is closer to 0, blocked-up shadows are more likely to appear in the second region.

Similarly to step S304A, in step S304B as well, the combination coefficient $\alpha$ may be changed stepwise at the boundary between the first region and the second region. Specifically, the combination coefficient $\alpha$ may be changed to gradually increase from $\alpha_1$ toward $\alpha_2$, from the side closer to the first region toward the side closer to the second region.

Return to FIG. 3, and when the processing in step S304B is complete, processing from step S302B to step S304B is repeated for each frame. Here, the first threshold is updated from the histogram of the visible light image, the exposure targets are updated from the luminance of the infrared light image in the first region and the luminance of the visible light image in the second region, images are captured for the next frame, and combining processing is performed.

As described above, the image capture apparatus 100 in this embodiment divides an image into a bright portion (a first region) and a dark portion (a second region), and generates a composite image with one of the first region and the second region including only a visible light image and the other thereof including only an invisible light image. Also, as a result of the visible light image sensor 103 and the infrared light image sensor 104 imaging the regions under appropriate exposure conditions and performing combining processing, the appearance of blown-out highlights and blocked-up shadows can be suppressed. A configuration is adopted in which at this time, image sensors that image a bright portion and a dark portion are switched depending on which of color information regarding the bright portion and color information regarding the dark portion is important, or which color reproducibility thereof has a priority. In the first image capturing mode, the color reproducibility of a bright portion has a priority, and a composite image is generated using the visible light image for the bright portion and the infrared light image for the dark portion. Also, in the second image capturing mode, a composite image is generated using the visible light image for the dark portion and the infrared light image for the bright portion. Accordingly, it is possible to suppress the appearance of blown-out highlights and blocked-up shadows without losing color information regarding a subject having important color information.

Although an example is shown in FIG. 1 in which the light separation unit 102 is constituted by the wavelength selection prism that transmits visible light and reflects infrared light, a wavelength selection prism that transmits infrared light and reflects visible right may be used. In this case, it is sufficient to switch the position of the visible light image sensor 103 and the position of the infrared light image sensor 104 in FIG. 1.

Also, although light with different spectrum characteristics is guided using the light separation unit 102 to the visible light image sensor 103 and the infrared light image sensor 104 in FIG. 1, a so-called twin-lens type in which the visible light image sensor 103 and the infrared light image sensor 104 have different independent optical systems may be used. Images are captured in synchronization with each other in this case as well. In this case, combining processing is performed based on combining parameters such that the positions of the same subject match each other in the respective pre-composite images. Examples of the combining parameters include parameters for performing deformation processing such as enlargement, reduction, and distortion correction of captured images, and parameters for clipping images from captured images that has undergone correction processing, for example. The combining parameters may be calculated and retained in the memory 107 in advance based on the arrangement relationship between the optical systems and the image sensors 103 and 104. Also, the image capture apparatus 100 may be configured by aligning the optical systems and the image sensors so that there is no need for alignment.

Because it is possible to provide the optical systems of the image sensors with independent diaphragms, the control of the diaphragms (so-called AV values) may be added to the control of exposure targets. Also, the visible light image sensor 103 and the infrared light image sensor 104 may each have an ND filter and a mechanism for inserting and removing the ND filter. In this case, insertion and removal of the ND filters may be added to the control of the exposure targets.

Also, the image capture apparatus 100 may include either or both of a white lighting element that selectively emits visible light or an infrared lighting element that selectively emits infrared light. Changing the output level of the white lighting element makes it possible to control the amount of light incident on the visible light image sensor 103 without changing the amount of light incident on the infrared light image sensor 104. Similarly, changing the output level of the infrared lighting element makes it possible to control the amount of light incident on the infrared light image sensor 104 without changing the amount of light incident on the visible light image sensor 103. Thus, the control of the output levels of the white lighting element and the infrared lighting element can also be added to the control of the exposure targets.

Figure 3:
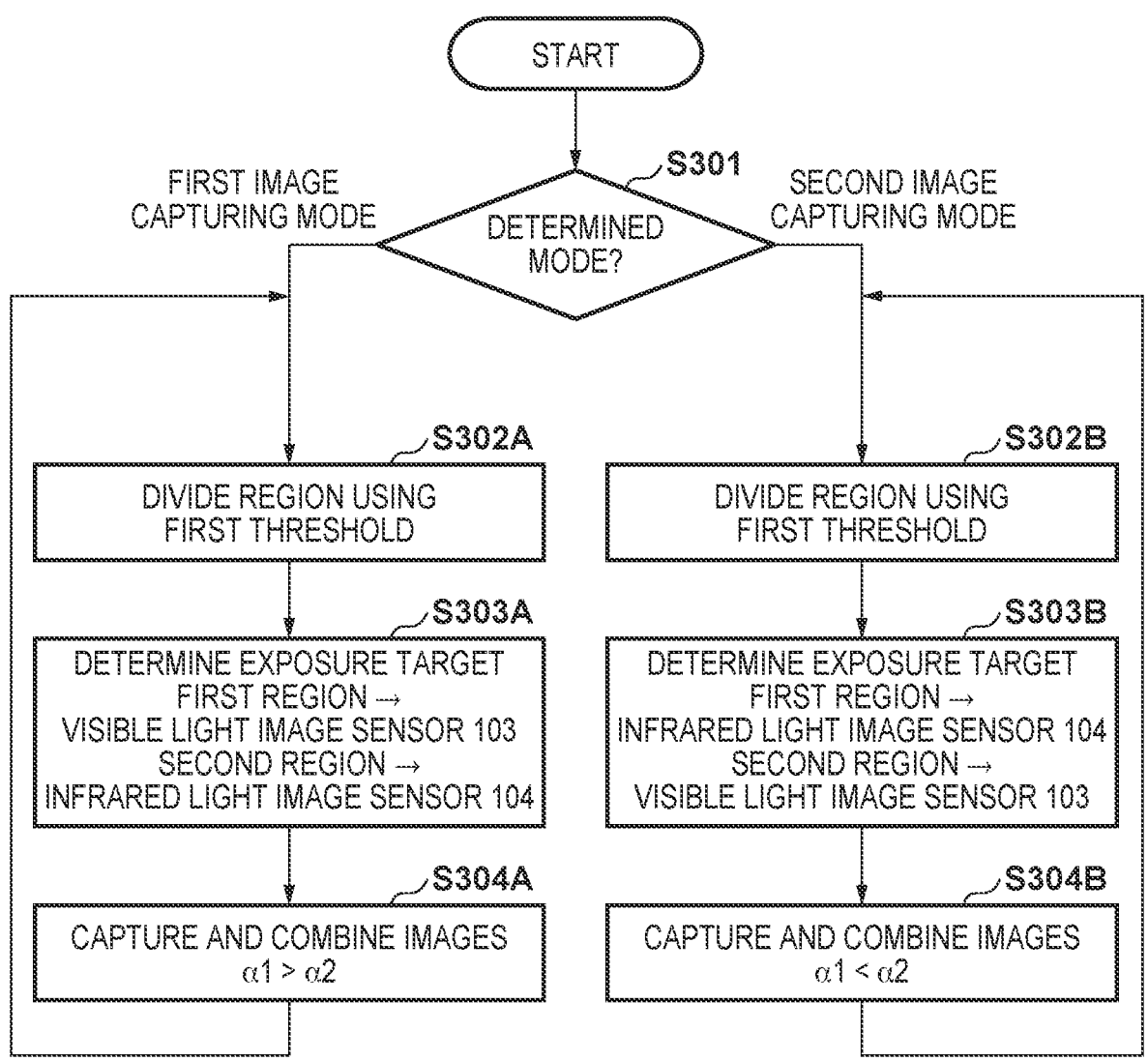
FIG. 3 is a flowchart showing one example of processing corresponding to an exemplary embodiment.

Although in the image capture apparatus 100, the first threshold is determined in the processing of steps S302A and S302B in the processing corresponding to the flowchart shown in FIG. 3, a configuration may be adopted in which a user can determine the first threshold. Specifically, a configuration may be adopted in which a screen such as that shown in FIG. 6A is displayed on the display of the output apparatus 208 and a setting input made by the user is accepted.

Figure 6A:
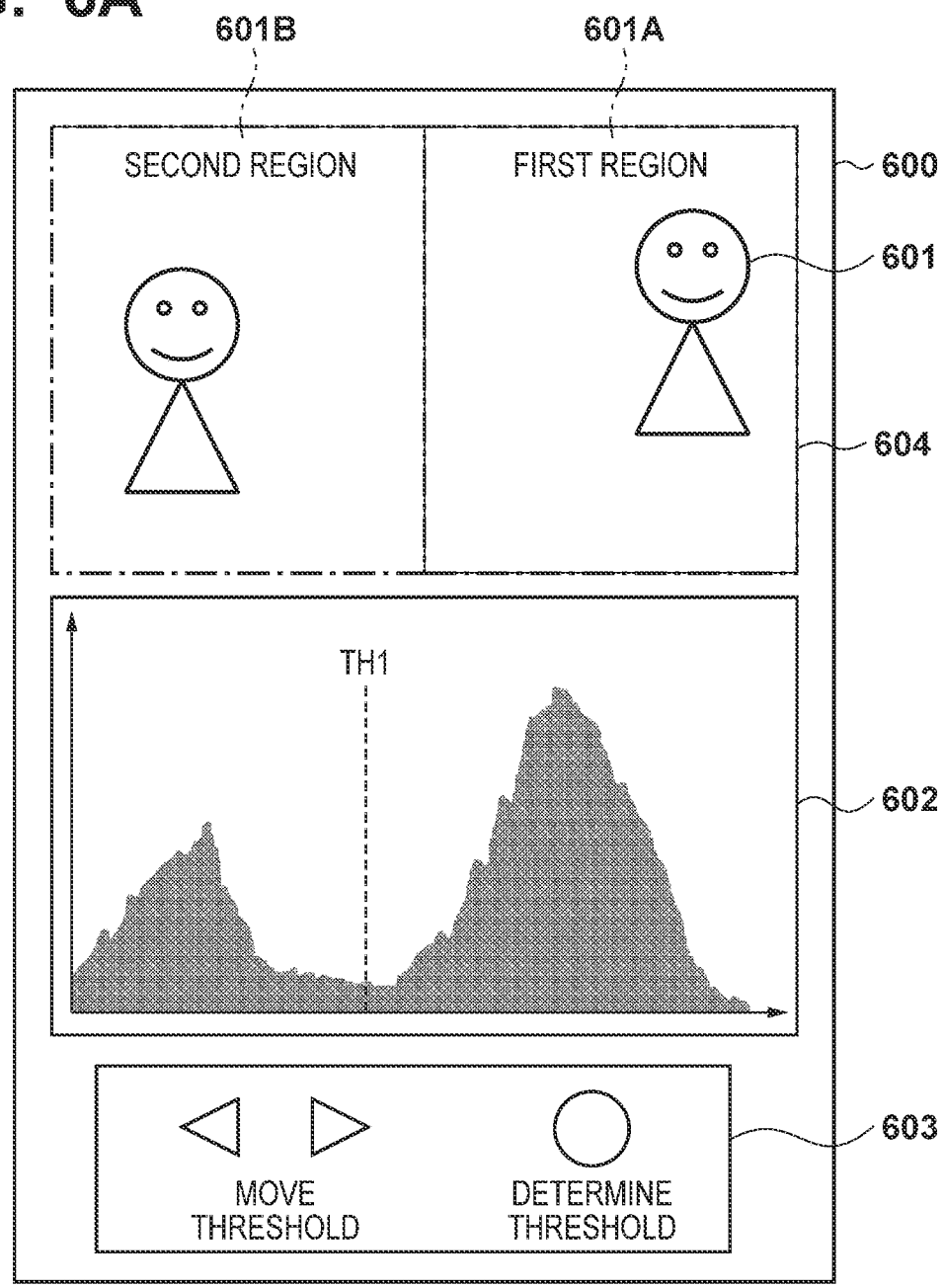
FIG. 6A is a diagram illustrating a method for a user to set a first threshold corresponding to an exemplary embodiment.

FIG. 6A is a diagram illustrating an example in which the user directly determines the first threshold from the histogram of a visible light image. In FIG. 6A, a screen 600 includes a region 601 for displaying a composite image, a region 602 for displaying the histogram, and a setting interface 603 for setting the first threshold (TH1) with reference to the histogram. The first threshold TH1 can be moved in the luminance direction (the horizontal axis direction) on the setting interface 603 by operating right and left direction buttons. When the first threshold is changed, a first region 601A and a second region 601B are displayed with a frame line 604 on a composite image displayed in the region 601 in accordance with the changed first threshold.

A configuration may be adopted in which a composite image with a changed combination coefficient α is displayed in the region 601 in accordance with the first threshold adjusted by the user at this time. When the first region 601A and the second region 601B are set as desired by the user, the user can determine the first threshold TH1 by operating a threshold determination button of the setting interface 603. The determined first threshold is retained in the memory 107, for example.

Figure 6B:
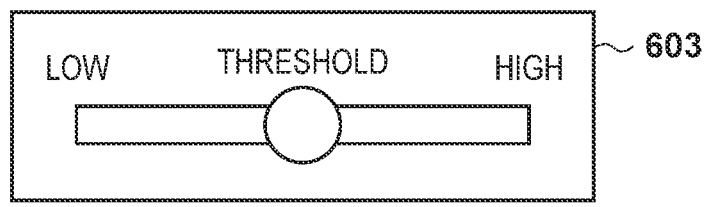
FIG. 6B is a diagram illustrating another method for a user to set a first threshold corresponding to an exemplary embodiment.

Next, FIG. 6B is a diagram showing an alternative example of the setting interface 603. In FIG. 6B, the threshold can be set by utilizing a scroll bar. The first threshold is set in accordance with the position of the scroll bar. Also, a configuration may be adopted in which a composite image with a changed combination coefficient can be displayed in the region 601 in accordance with the first threshold adjusted by the user.

Figure 7:
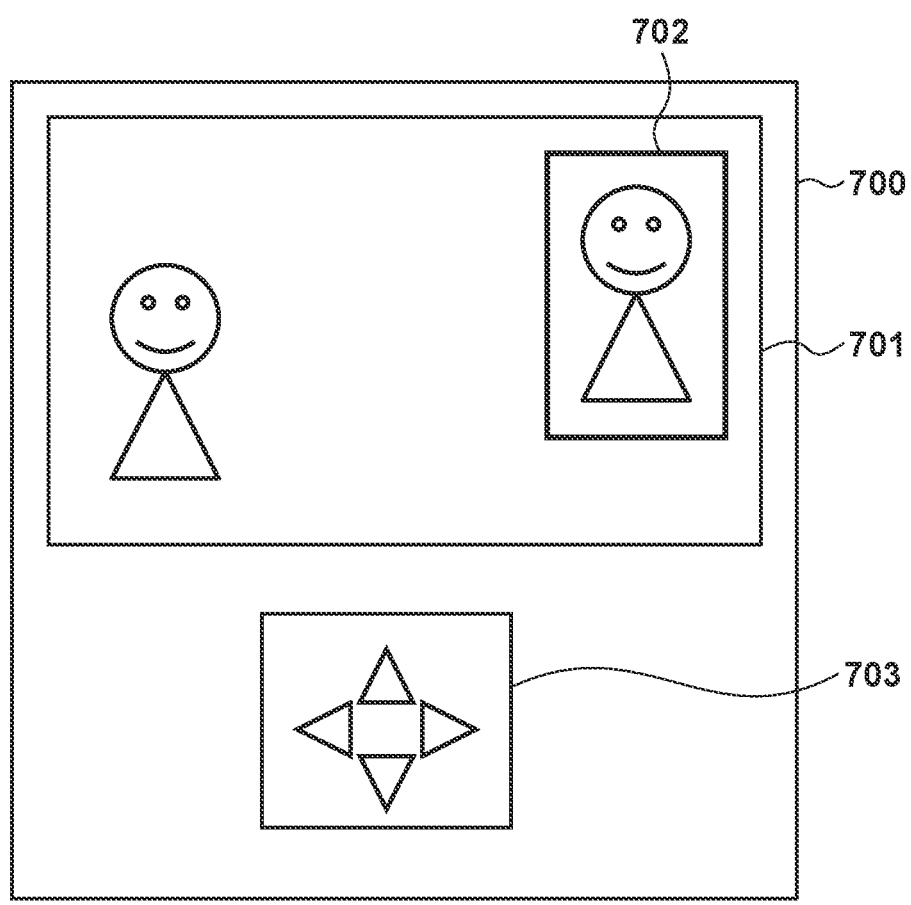
FIG. 7 is a diagram illustrating yet another method for a user to set a first threshold corresponding to an exemplary embodiment.

The case where the user selects, as the operation mode, either the bright portion color emphasis mode (the first image capturing mode) or the dark portion color emphasis mode (the second image capturing mode) was described in FIG. 4 above. The embodiment is not limited thereto, and the user may directly designate a region where color information is to be emphasized, instead of the operation mode. FIG. 7 shows one example of a user interface displayed in such a case. In FIG. 7, a region 701 for displaying a composite image is displayed on a screen 700, and a display 702 indicating a region where color information is to be emphasized is superimposed on the displayed image. This display 702 can be set using the interface 703. The interface 703 can be realized by a touch panel or cursor key, for example.

The image capture apparatus 100 can determine that the user is emphasizing color information regarding a bright portion in a case where the average luminance (the intermediate value) of the region 702 designated by the user is more than or equal to the average luminance (the intermediate value) of a region other than the region 702. In this case, the image capture apparatus 100 operates in the first image capturing mode. On the other hand, the image capture apparatus 100 can determine that the user has emphasized color information regarding a dark portion in a case where the average luminance (the intermediate value) of the region 702 is less than or equal to the average luminance (the intermediate value) of a region other than the region 702. In this case, the image capture apparatus 100 operates in the second image capturing mode.

The user may not only directly but also indirectly designate the region 702 where color information is to be emphasized. A configuration may be adopted in which, in a case where the user designates a tracking mode as the operation mode of the image capture apparatus 100, for example, it is decided that the user wants to emphasize color information regarding a person or vehicle that is a subject to be tracked, and the image capturing mode is determined through comparison between the average value of the luminance of the subject to be tracked and the average value of the luminance of the background other than the subject portion.

In a case where the average luminance (the intermediate value) of a region corresponding to the person as the subject is more than or equal to the average luminance (the intermediate value) of the other region, for example, the image capture apparatus 100 determines that the user is emphasizing color information regarding a bright portion, and operates in the first image capturing mode. On the other hand, in a case where the average luminance of the region corresponding to the person is less than or equal to the average luminance of the other region, the image capture apparatus 100 determines that the user is emphasizing color information regarding a dark portion, and operates in the second image capturing mode. Note that in a case where there are a plurality of subjects that can be tracked, designation of the subject to be tracked may be accepted from the user.

Also, there are cases where combination coefficients for the first region and the second region need not be different from each other depending on the shape of a histogram. In a case where a difference in brightness in a scene such as that shown in FIG. 5 is smaller than a predetermined value, for example, even if either a visible light image or an infrared light image is used, no blown-out highlights or blocked-up shadows appear. In view of this, in such a case, combining processing may be executed on the first region and the second region with the same combination coefficient ($\alpha_1 = \alpha_2$).

Here, the difference in brightness in a scene can be defined using a ratio between the maximum value and the minimum value in the luminance value of the histogram. At this time, it is preferable to remove, as noise, significantly infrequent signals and then define the ratio between the maximum value and the minimum value. A predetermined value for determining the difference in brightness can be determined based on the dynamic range of the visible light image sensor 103 (a ratio of the maximum signal level to the minimum signal level). Specifically, it is preferable to determine the predetermined value to be a value that is 0.1 times or more and 1 time or less the dynamic range of the visible light image sensor 103.

Also, the combination coefficient in a case where a scene has a small difference in brightness may be determined using the luminance of a visible light image (the illuminance of a subject obtained therefrom). In a case where the luminance of a visible light image is sufficiently high (higher than a predetermined luminance value), it is preferable to emphasize color reproducibility and make the combination coefficient $\alpha$ closer to 1. On the other hand, in a case where the luminance of a visible light image is sufficiently low (less than or equal to the predetermined luminance value), it is preferable to make the combination coefficient $\alpha$ closer to 0. This is because an infrared light component is more likely to be intenser than a visible light component at low illuminance such as at night, and making $\alpha$ closer to 0 makes it possible to acquire a composite image that has a better SN ratio than that of a visible light image and has both luminance information and color information.

Note that when the mode is switched to a mode in which the same combination coefficient is used for all regions from a state in which different combination coefficients are used for the first region and the second region, an indication thereof may be displayed in a pop-up manner. Also, a configuration may be adopted in which a mode for emphasizing both bright and dark portion colors (a third image capturing mode) can be selected in the region 402 shown in FIG. 4, in addition to the bright portion color emphasis mode (the first image capturing mode) and the dark portion color emphasis mode (the second image capturing mode). In the case of the third image capturing mode, the same combination coefficient, which is determined in accordance with the luminance of a visible light image, is used for all regions.

Note that the case where processing for combining a visible light image and an infrared light image is executed mainly by the image processing unit 106 of the image capture apparatus 100 was described in the above-described embodiment. However, the embodiment is not limited thereto. A configuration may be adopted in which a visible light image and an infrared light image generated by the image capture apparatus 100 are transmitted to the information processing apparatus 120 side via the network 110, and the information processing apparatus 120 functions as an image processing apparatus that executes combining processing. The content of processing is the same as the above in this case as well.

As described above, in a case where a scene has a large difference in brightness, the image capture apparatus 100 corresponding to this embodiment suppresses the appearance of blown-out highlights and blocked-up shadows without losing color information regarding a subject having important color information. Also, in a case where a scene has a small difference in brightness, by controlling a combination coefficient in accordance with the brightness of the entire scene, it is possible to acquire an image having a good SN ratio and having both luminance information and color information at low illuminance as well.

Embodiment 2

With the image capture apparatus 100 described in Embodiment 1, the user selects whether color information regarding a bright portion is desired to be emphasized or color information regarding a dark portion is desired to be emphasized. In contrast, in this embodiment, whether color information regarding a bright portion is important or whether color information regarding a dark portion is important is determined as a result of an image capture apparatus 100 analyzing an image. The configuration of the image capture apparatus corresponding to this embodiment is similar to the image capture apparatus described with reference to FIGS. 1 and 2B.

Processing according to this embodiment may be implemented by executing an image analysis processing step and a region division processing step, instead of the mode determination processing step in step S301 of the flowchart shown in FIG. 3, for example.

More specifically, first, in the image analysis processing, a region (a subject region) corresponding to a subject (or, an object, a moving object, or the like) is detected and recognized from the entire scene based on a visible light image captured using the initial value of a predetermined exposure target. Examples of the subject to be detected and recognized include persons and cars, which are particularly important in surveillance applications and the like, and subjects to be recognized can be learned through machine learning in advance.

In the subsequent region division processing, it is possible to determine which of color information regarding a bright portion and color information regarding a dark portion is important, from the importance of color information regarding each subject region, and to determine the image capturing mode. The importance of color information can be obtained using the following equation using the F-measure (a calculated value obtained through harmonic mean calculation of the precision ratio and the recall ratio) obtained in a case where subject recognition is performed on the infrared light image (only luminance information) and the F-measure obtained in a case where subject recognition is performed on a visible light image (both luminance information and color information).

Importance of color information=$F$-measure for visible light image/$F$-measure for infrared light image  (Equation 10)

According to the above equation, it is defined that color information is important with respect to a subject for which the ratio of the F-measure obtained in a case where subject recognition is performed on the visible light image to the F-measure obtained in a case where subject recognition is performed on the infrared light image is large. Examples of the subject with a higher importance of color information include road signs, and examples of the subject with a lower importance of color information include character information. Note that the F-measure for the visible light image and the F-measure for the infrared light image can be obtained in advance through machine learning using visible light images and infrared light images.

Next, it is determined which of color information regarding a bright portion and color information regarding a dark portion is important, from the importance of color information regarding each subject. A description will be given below by classifying cases depending on the number of detected subjects.

In a case where the number of detected subjects is 1, color information regarding this subject is important, and thus the average luminance (the intermediate value) of the detected subject is compared to the luminance average (the intermediate value) of the background other than the detected subject. Then, if the average luminance of the detected subject is more than or equal to the average luminance of the background, the image capture apparatus 100 operates in the first image capturing mode, whereas if the average luminance of the detected subject is lower than the average luminance of the background, the image capture apparatus 100 operates in the second image capturing mode.

In a case where the number of detected subjects is 2, the importances of pieces of color information regarding the two subjects are compared to each other and the average luminances (the intermediate values) thereof are compared to each other. Then, in a case where the average luminance of a first subject with a relatively high color information importance is higher than the average luminance of a second subject with a relatively low color information importance, the image capture apparatus 100 operates in the first image capturing mode. On the other hand, in a case where the average luminance of a subject with a relatively high color information importance is lower than the average luminance of a subject with a relatively low color information importance, the image capture apparatus 100 operates in the second image capturing mode.

In a case where the number of detected subjects is 3 or more, the need to assign a plurality of subjects to a bright portion or a dark portion arises. In such a case, a mode is preferable in which subjects with a higher color information importance are collected in either the bright portion or the dark portion, and color information regarding a portion in which such subjects are collected is emphasized. Specifically, a method for determining the image capturing mode in a case where the number of detected subjects is 3 or more will be described with reference to FIGS. 8A to 8D, using, as an example, a case where the number of detected subjects is 3.

Figure 8A:
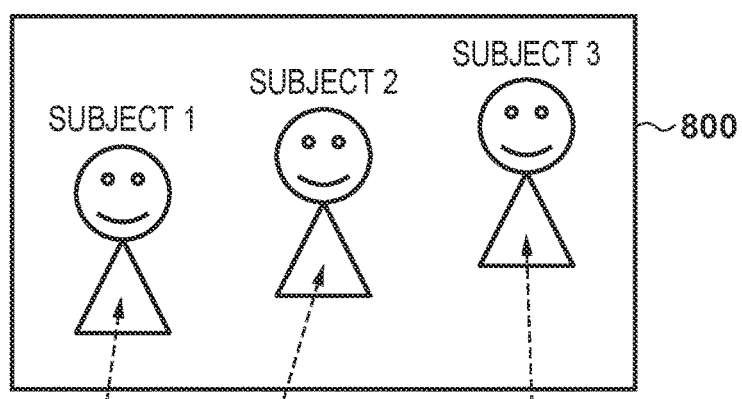
FIGS. 8A to 8D are diagrams illustrating one example of a method for dividing a region corresponding to an exemplary embodiment.
Figure 8B:
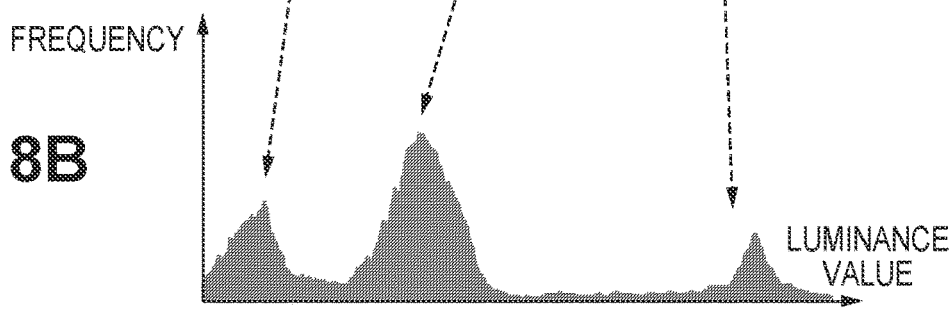
Figure 8C:
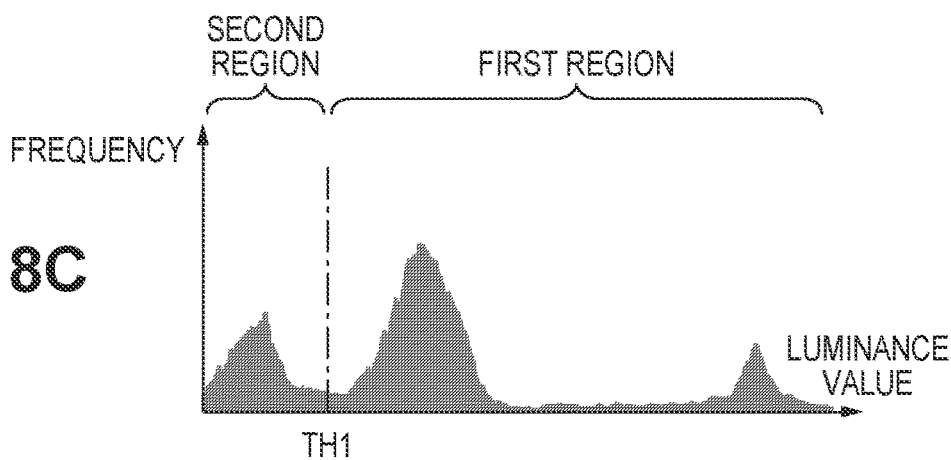
Figure 8D:
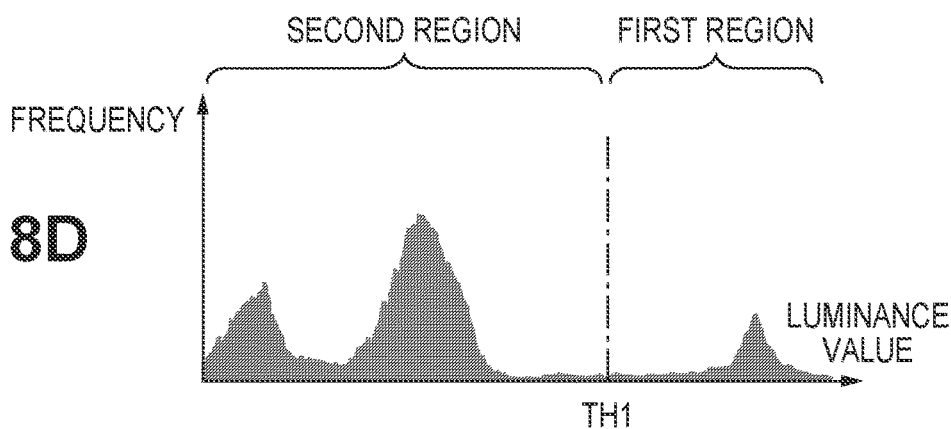

FIG. 8A shows one example of a visible light image 800 in which three subjects are included. Here, a subject 1, a subject 2, and a subject 3 are included therein. FIG. 8B shows the histogram of the visible light image. According to FIG. 8B, the histogram has three blocks, indicating the three subjects 1 to 3 included in the visible light image. There are two methods for assigning a plurality of subjects to the bright portion and the dark portion, one of which involving setting only a subject with the smallest luminance to the dark portion as shown in FIG. 8C, and the other of which involving setting only a subject with the largest luminance to the bright portion as shown in FIG. 8D.

This can be considered as a grouping problem for classifying the subjects 1 to 3 into two groups. Out of the two groups, a first group corresponds to the first region, that is, the bright portion, and a second group corresponds to the second region, that is, the dark portion. Grouping of three subjects has two classification patterns under the conditions that at least one subject is included in one group. Specific classification patterns include a case where the first group includes the subject 2 and the subject 3 and the second group includes the subject 1, and a case where the first group includes the subject 3 and the second group includes the subject 1 and the subject 2. These types of grouping respectively correspond to the histograms shown in FIGS. 8C and 8D.

In this embodiment, with regard to the two classification patterns, the harmonic means of color information importances of groups are calculated, and a larger ratio is selected from ratios of the group harmonic means for the respective classification patterns. Specifically, assuming that the harmonic mean of color information importances of subjects assigned to the first group (the bright portion) is CB, harmonic means CBc and CBd are obtained in the two combinations shown in FIGS. 8C and 8D. Also, assuming that the harmonic mean of color information importances of subjects assigned to the second group (the dark portion) is CD, harmonic means CDc and CDd are obtained in the two combinations shown in FIGS. 8C and 8D. Then, the ratio is calculated by comparing these harmonic means in the respective patterns of combination. A method for calculating the ratio changes depending on the magnitude relationship between CB and CD, and a larger value comes to the numerator.

In the case of CBc>CDc, the ratio is calculated using CBc/CDc, and in the case of CDc>CBc, the ratio is calculated using CDc/CBc, for example. The same applies to the case of CBd and CDd. The ratios obtained in this manner are compared, and in a case where CBc/CDc>CDd/CBd, the classification pattern shown in FIG. 8C is selected.

In a case where CB>CD with regard to the ratio selected in this manner, the color information importance of the bright portion is higher than the color information importance of the dark portion, and thus the image capture apparatus 100 operates in the first image capturing mode. On the other hand, in a case where CD>CB, the color information importance of the dark portion is higher than the color information importance of the bright portion, and thus the image capture apparatus 100 operates in the second image capturing mode.

Note that when color information importances of a plurality of subjects are obtained, the weighted harmonic mean may be obtained, instead of simply calculating the harmonic mean. A greater weight may be given to a subject that may be difficult to recognize, such as a small subject, such that the color information importance thereof increases, for example. Alternatively, a configuration may be adopted in which in a case where it is detected that a subject moves, through vector matching between a plurality of frames, it is decided that the importance of recognizing a moving subject is high, and weights are given such that the larger the movement of a subject is, the higher the importance of color information is. Also, a correction coefficient may be multiplied such that as the number of subjects increases, the importance of color information increases. Alternatively, a correction coefficient may be multiplied such that as the colorfulness of a subject increases, the importance of color information increases.

In this manner, according to this embodiment, with the image capture apparatus 100, it is possible to determine through image analysis whether color information regarding a bright portion is important or color information regarding a dark portion is important, and to determine an image capturing mode.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-044191 filed on Mar. 11, 2019 which is hereby incorporated by reference herein in its entirety.

What is claimed is:

1. An image processing apparatus comprising:
an acquisition unit configured to acquire a visible light image and an invisible light image;
a determination unit configured to determine a region on an image based on the visible light image or the invisible light image acquired by the acquisition unit; and
a combining unit configured to generate a composite image such that a combination ratio of the visible light image is larger than a combination ratio of the invisible light image in the region determined by the determination unit,
wherein the acquisition unit acquires the visible light image for which an exposure is adjusted such that a region of the visible light image that corresponds to the region determined by the determination unit has an appropriate exposure, and
wherein the determination unit determines, based on a histogram of luminance of the visible light image, as the region, a region where the luminance is a predetermined value or more, or a region where the luminance is less than the predetermined value.

2. The image processing apparatus according to claim 1, wherein the acquisition unit acquires the invisible light image for which the exposure is adjusted such that a region other than the region determined by the determination unit has the appropriate exposure, and
the combining unit generates the composite image such that the combination ratio of the visible light image is smaller than the combination ratio of the invisible light image in the region other than the region determined by the determination unit.

3. The image processing apparatus according to claim 1, wherein the determination unit determines the region based on a subject included in the visible light image or the invisible light image.

4. The image processing apparatus according to claim 3, wherein the determination unit calculates a ratio of a calculation value obtained in a case where subject recognition is performed on the visible light image to a calculation value obtained in a case where the subject recognition is performed on the invisible light image, and determines the region based on a subject having the largest ratio, out of a plurality of subjects, and
the calculation values are obtained by calculation based on a precision ratio and a recall ratio obtained in a case where the subject recognition is performed.

5. The image processing apparatus according to claim 3, wherein in a case where the visible light image includes three or more subjects, the determination unit determines a region where the combination ratio of the visible light image is larger than the combination ratio of the invisible light image, based on harmonic mean of ratios of calculation values obtained in a case where the subject recognition is performed on the visible light image and the invisible light image, and
the calculation values are obtained by calculation based on a precision ratio and a recall ratio obtained in a case where the subject recognition is performed.

6. The image processing apparatus according to claim 5, wherein the determination unit calculates the harmonic mean with a weight given in accordance with a size of the subject.

7. The image processing apparatus according to claim 1, wherein in a case where a difference in brightness of pixels in the visible light image is smaller than a threshold, with regard to the region determined by the determination unit and a region other than the region, the combining unit uses the same combination ratio for the visible light image and the invisible light image.

8. The image processing apparatus according to claim 4, further comprising
a switching unit configured to be capable of switching a first mode in which the determination unit determines, as the region, a region having a luminance of the predetermined value or more and a second mode in which the determination unit determines, as the region, a region having a luminance of less than the predetermined value.

9. A method for controlling an image processing apparatus, comprising:
acquiring a visible light image and an invisible light image;
determining a region on an image based on the visible light image or the invisible light image acquired in the acquiring; and
generating a composite image such that a combination ratio of the visible light image is larger than a combination ratio of the invisible light image in the region determined in the determining,
wherein in the acquiring, the visible light image is acquired for which an exposure is adjusted such that a region of the visible light image that corresponds to the region determined in the determining has an appropriate exposure, and
wherein in the determining, a region where a luminance is a predetermined value or more, or a region where the luminance is less than the predetermined value is determined as the region based on a histogram of luminance of the visible light image.

10. The method according to claim 9,
wherein in the acquiring, the invisible light image is acquired for which the exposure is adjusted such that a region other than the region determined in the determining has the appropriate exposure, and
in the generating the composite image, the composite image is generated such that the combination ratio of the visible light image is smaller than the combination ratio of the invisible light image in the region other than the region determined in the determining.

11. The method according to claim 9,
wherein in the determining, the region is determined based on a subject included in the visible light image or the invisible light image.

12. The method according to claim 11,
wherein in the determining, a ratio of a calculation value obtained in a case where subject recognition is performed on the visible light image to a calculation value obtained in a case where the subject recognition is performed on the invisible light image is calculated, and the region is determined based on a subject having the largest ratio, out of a plurality of subjects, and
the calculation values are obtained by calculation based on a precision ratio and a recall ratio obtained in a case where the subject recognition is performed.

13. A non-transitory computer-readable storage medium storing one or more programs including instructions that, when executed by a processor of an image processing apparatus configured to combine a visible light image and an invisible light image to generate a composite image, causes the image processing apparatus to perform operations of:
acquiring a visible light image and an invisible light image;
determining a region on an image based on the visible light image or the invisible light image acquired in the acquiring; and
generating a composite image such that a combination ratio of the visible light image is larger than a combination ratio of the invisible light image in the region determined in the determining,
wherein in the acquiring, the visible light image is acquired for which an exposure is adjusted such that a region of the visible light image that corresponds to the region determined in the determining has an appropriate exposure, and
wherein in the determining, a region where a luminance is a predetermined value or more, or a region where the luminance is less than the predetermined value is determined as the region based on a histogram of luminance of the visible light image.

* * * * *